(12) United States Patent
Kopetzky

(10) Patent No.: US 6,650,982 B2
(45) Date of Patent: Nov. 18, 2003

(54) METHOD FOR THE RESTRAINT OF A VEHICLE OCCUPANT

(75) Inventor: Robert Kopetzky, Lonsee (DE)

(73) Assignee: Takata (Europe) Vehicle Safety Technology GmbH, Ulm (DE)

( * ) Notice: Subject to any disclaimer, the term of this patent is extended or adjusted under 35 U.S.C. 154(b) by 0 days.

(21) Appl. No.: 10/139,253

(22) Filed: May 7, 2002

(65) Prior Publication Data

US 2002/0165653 A1 Nov. 7, 2002

(30) Foreign Application Priority Data

May 7, 2001 (DE) .......................... 101 22 048

(51) Int. Cl.$^7$ ................................ G06F 7/00
(52) U.S. Cl. .................. 701/45; 180/268; 180/271; 280/734; 280/801.1
(58) Field of Search .............. 701/45, 46, 47; 180/268, 271, 273; 280/734, 735, 801.1, 803

(56) References Cited

U.S. PATENT DOCUMENTS

| 4,099,770 | A | * | 7/1978 | Elsholz et al. ......... 297/216.11 |
| 4,159,127 | A | * | 6/1979 | Czernakowski et al. .... 280/751 |
| 4,886,296 | A | * | 12/1989 | Brodmann ................. 280/805 |
| 5,552,986 | A | | 9/1996 | Omura et al. ................ 701/45 |
| 5,820,058 | A | * | 10/1998 | Hirzel et al. .............. 242/379.1 |

FOREIGN PATENT DOCUMENTS

| DE | 41 12 579 A1 | 10/1991 |
| DE | 44 17 710 A1 | 9/1995 |
| DE | 44 11 484 A1 | 10/1995 |
| DE | 197 31 689 A1 | 2/1999 |
| GB | 2 243 533 | 11/1991 |

* cited by examiner

*Primary Examiner*—Gertrude Arthur
(74) *Attorney, Agent, or Firm*—Foley & Lardner

(57) ABSTRACT

A method for the restraint of a vehicle occupant with the aid of a vehicle restraint system. The method includes measuring a belt force transferred from a safety belt to the vehicle occupant in the event of an accident and a slackening of the safety belt is controlled.

20 Claims, 1 Drawing Sheet

METHOD FOR THE RESTRAINT OF A VEHICLE OCCUPANT

The priority document, German Patent Application No. 101 22 048 filed May 7, 2001, is incorporated by reference herein in its entirety.

BACKGROUND

The present invention relates to a method for the restraint of a vehicle occupant with the aid of a vehicle restraint system which comprises a windable three-point safety belt.

It is known to limit the belt force occurring in restraint systems by, for example, a deformable element, for example a torsion rod, being deformed in the event of an accident, whereby energy is dissipated and the belt force acting on the vehicle occupant is limited for a time.

SUMMARY OF THE INVENTION

It is an object of the present invention to provide a method for the restraint of a vehicle occupant with which the risk of injury is further reduced in the event of an accident.

According to an embodiment of the present invention, a method is provided that includes the steps of: measuring a reaction force (belt force) being transferred, in the event of an accident, from the safety belt to the vehicle occupant; and controlling a direct slackening of the safety belt such that the belt force does not exceed a pre-set maximum value.

In accordance with the invention, the load acting on the vehicle occupant is not passively limited, but the belt force which actually occurs is measured and the safety belt is slacked in dependence on this measured belt force so that the pre-set maximum value is not exceeded. Preferably, the maximum deceleration of the occupant occurs as early as possible with the aid of the safety belt and to maintain this maximum deceleration in the further development.

According to an embodiment of the present invention, a forward displacement of the vehicle occupant is also measured and the slackening of the safety belt is additionally controlled in dependence on this forward displacement, with the forward displacement preferably being measured in dependence on time so that a restraint of the vehicle occupant can take place in real time.

The slackening of the safety belt can take place by an actively influenceable braking device which acts on the safety belt. For example, an eddy current brake or a mechanical brake with frictional resistance can be provided.

The reaction force transferred from the safety belt to the vehicle occupant can preferably be measured in a reel of the safety belt or in a belt lock of the safety belt. It is also possible to determine the belt force in the region of a belt deflection.

The forward displacement of the vehicle occupant can be measured by determining the rotational movement of a spindle of a belt reel of the safety belt. Alternatively, it is possible to determine the forward displacement of the vehicle occupant by a radiation sensor, for example an infrared sensor, or a miniature camera arranged in the interior of the vehicle.

The weight of the vehicle occupant is preferably measured, for example by a device integrated in the vehicle seat, and the direct slackening of the safety belt may be additionally controlled in dependence on the weight measured. As a result, the belt forces be matched more precisely to the respective vehicle occupant.

A direct slackening of the safety belt is preferably only effected after the safety belt has been tensioned by a belt tensioning device.

The direct slackening of the safety belt can be controlled such that the pre-set maximum value of the belt force is reached as early as possible—relative to the time of the impact of the accident—and is maintained during the time of the impact of the accident.

The present invention also comprises various embodiments of a vehicle restraint system having the apparatus features described herein.

It is to be understood that both the foregoing general description and the following detailed description are exemplary and explanatory only, and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

DETAILED DESCRIPTION

Figure 1:
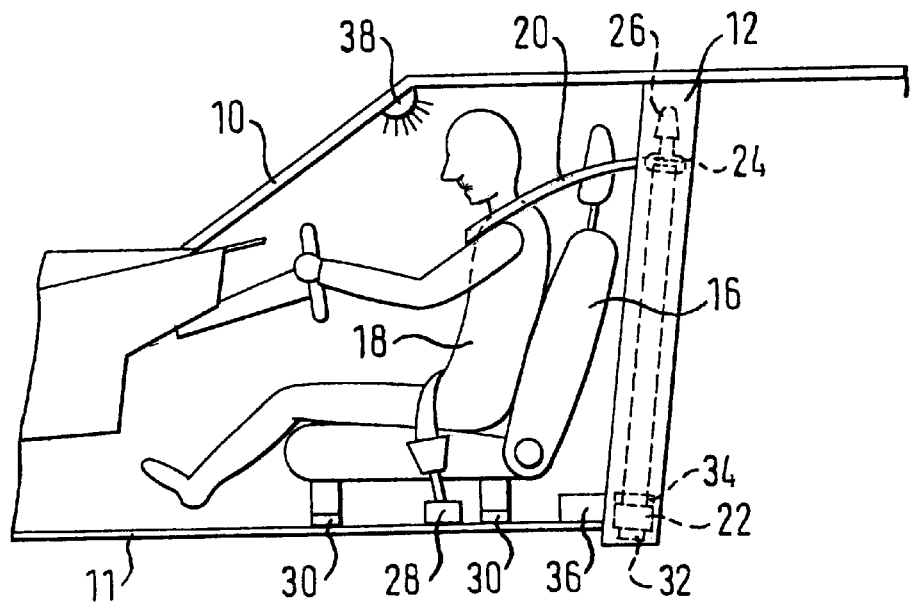
FIG. 1 is a schematic side view of a motor vehicle restraint system.

FIG. 1 shows a schematic side view of a restraint system which is installed in a vehicle. An A pillar 10, a B pillar 12 and a vehicle floor 11 of the vehicle are shown, with a vehicle seat 16 being located on the vehicle floor 11. A vehicle occupant 18 is shown on the vehicle seat 16. The occupant 18 is secured by a three-point safety belt 20. The safety belt 20 is wound up in a belt reel 22 in a conventional manner and guided at the B pillar 12 via a belt deflection 24 which is coupled to a belt tensioner 26. The other end of the safety belt 20 is fixedly coupled to the vehicle floor 11 via a force measuring device 28.

The vehicle seat 16 is provided at its floor supports with a device for the weight determination 30 for determining the weight or the mass of the occupant 18 located on the vehicle seat 15. A measuring device 32 for the pulled out length of belt and a braking device 34, with which the pulling out of the belt can be blocked, are further provided in the belt reel 22. Furthermore, a measuring device 36 is provided at the vehicle floor 11 with which the speed and the acceleration of the vehicle can be determined. As an alternative, the crash sensor which is typically provided to initiate the triggering of the deployment of an airbag can be used.

A sensor 38 is located in the region of the A pillar 10 with which the forward displacement of the vehicle occupant 18 can be detected. The sensor 38 can be an infrared sensor, a video camera or the like.

Figure 2:
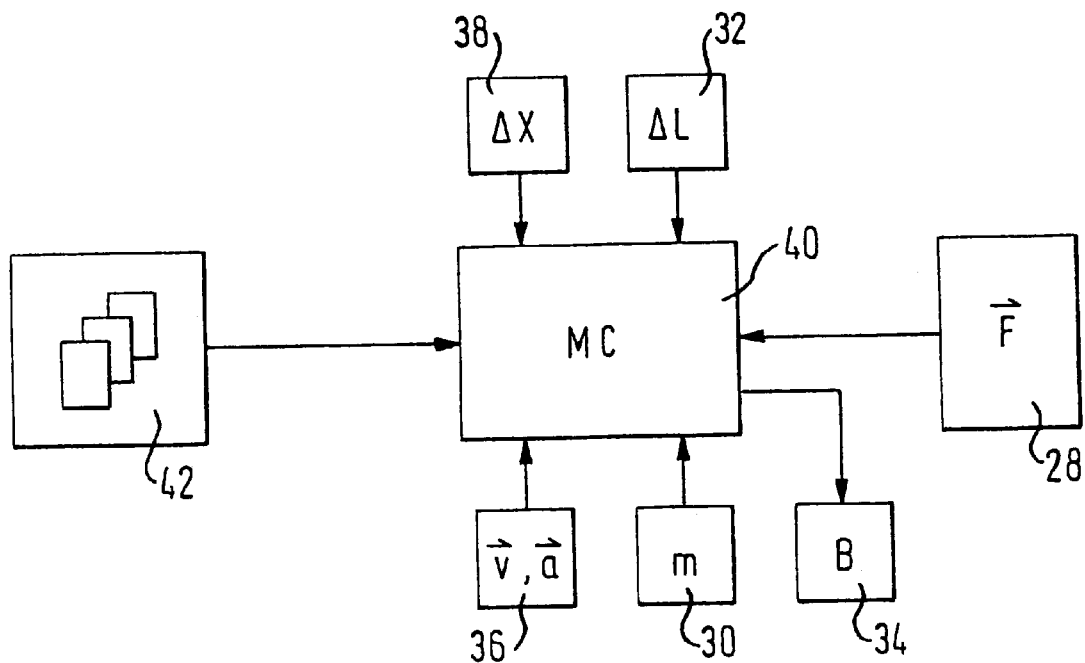
FIG. 2 is a schematic circuit diagram of the restraint system of FIG. 1.

FIG. 2 shows a schematic circuit diagram of the restraint system of the invention. As shown in FIG. 2, a controller 40 is provided which is in connection with a memory 42. The controller 40 is further in connection with the sensor 38, the measuring device 32 for the pulled out length of belt, the force measuring device 28, the measuring device 36 for the speed and acceleration of the vehicle, the weight measuring device 30 and the braking device 34.

In the method of the invention for the restraint of the vehicle occupant 18, the acceleration or change in speed which occurs in the event of an accident is detected by the measuring device 36 and an accident signal is transmitted to the controller 40. A direct slackening of the safety belt 20 is controlled via the braking device 34 in dependence on a permitted forward displacement of the vehicle occupant stored in the memory 42 such that the reaction force (belt force) transmitted to the vehicle occupant does not exceed a pre-set maximum value stored in the memory 42.

In accordance with an embodiment of the invention, the forward displacement of the occupant 18 is determined by the sensor and a direct slackening of the safety belt 20 is controlled in dependence on this measured forward displacement with the aid of the braking device 34. Characteristic fields for permitted maximum values for occupant loads are preferably stored in the memory 42. These stored values can be determined by trials carried out with the aid of dummies. The values in question can be accelerations, forces, torques and paths, for example chest crushing, at the presently usual measuring points of dummies. The values are preferably read out of the characteristic fields in the memory 42 in dependence on occupant characteristic values, that is, for example, on the body weight of the vehicle occupant which was determined by the measuring device 30. The permitted maximum value can further be read in dependence on the vehicle deceleration which is made available by the measuring device 36.

As an alternative or in addition to the sensor 38, the measuring device 32, which determines the belt pull out length, can be used to determine the forward displacement of the vehicle occupant 18. Moreover, a direct slackening of the safety belt can only be effected with the aid of the braking device 34 after the safety belt 20 has been tensioned by the belt tensioning device 26.

The control of the restraint system of the invention is preferably carried out in real time. The aim of the method of the invention is always the largest possible reduction in the load values acting on the vehicle occupant by a direct and electronically controlled slackening of the safety belt in the event of an accident, in particular in dependence on the severity of the accident, the development of the accident and the size or the weight of the vehicle occupant.

What is claimed is:

1. A method for the restraint of a vehicle occupant with the aid of a vehicle restraint system which comprise a windable three-point safety belt, comprising the steps of:
    permitting forward displacement of the vehicle occupant in the event of an accident;
    controlling a direct slackening of the safety belt in dependence on the permitted forward displacement such that the reaction force (belt force) transmitted to the vehicle occupant does not exceed a pre-set maximum value.

2. The method of claim 1, further comprising the step of measuring the reaction force (belt force) transmitted from the safety belt to the vehicle occupant in a reel or in a belt lock of the safety belt.

3. The method of claim 1, further comprising the step of measuring the forward displacement of the vehicle occupant by determining the rotary movement of a spindle of a belt reel of the safety belt.

4. The method of claim 1, further comprising the step of determining the forward displacement of the motor vehicle occupant using an infrared sensor.

5. The method of claim 1, further comprising the step of determining the forward displacement of the motor vehicle occupant using a camera.

6. The method of claim 1, wherein the direct slackening of the safety belt is only effected after the safety belt has been tensioned by a belt tensioning device.

7. The method of claim 1, wherein the slackening of the safety belt is controlled in dependence on the development of the accident.

8. The method of claim 1, wherein the slackening of the safety belt is controlled in real time.

9. The method of claim 1, wherein the slackening of the safety belt is controlled by an actively influenceable braking device acting on the safety belt.

10. The method of claim 9, wherein the braking device is an eddy current brake.

11. The method of claim 1, wherein the permitted forward displacement of the vehicle occupant is recalled from storage in a look-up table based on a measured severity of the accident.

12. The method of claim 1, wherein during an early achievement of the permitted forward displacement, the slackening of the safety belt is controlled such that a digressive reaction force development is always ensured.

13. A method for the restraint of a vehicle occupant with the aid of a vehicle restraint system which comprises a windable three-point safety belt, comprising the steps of:
    permitting forward displacement of the vehicle occupant in the event of an accident;
    controlling a direct slackening of the safety belt in dependence on the permitted forward displacement such that the reaction force (belt force) transmitted to the vehicle occupant does not exceed a pre-set maximum value; and
    measuring the forward displacement of the vehicle occupant in dependence on time, and wherein the step of controlling the direct slackening of the safety belt includes controlling the slackening of the safety belt n dependence on the measured forward displacement and characteristic vehicle values.

14. The method of claim 13, wherein an acceleration and/or speed of the vehicle is used as the characteristic vehicle values.

15. A method for the restraint of a vehicle occupant with the aid of a vehicle restraint system which comprises a windable three-point safety belt, comprising the steps of:
    permitting forward displacement of the vehicle occupant in the event of an accident;
    controlling a direct slackening of the safety belt in dependence on the permitted forward displacement such that the reaction force (belt force) transmitted to the vehicle occupant does not exceed a pre-set maximum value; and
    recalling the permitted forward displacement of the vehicle occupant from a storage in memory and wherein the slackening of the safety belt is controlled in dependence on the stored forward displacement as well as in dependence on characteristic vehicle values and characteristic occupant values.

16. The method of claim 15 wherein the size and/or weight of the occupant is used as the characteristic occupant values.

17. The method of claim 15, wherein an acceleration and/or speed of the vehicle is used as the characteristic vehicle values.

18. A method for the restraint of a vehicle occupant with the aid of a vehicle restraint system which comprises a windable three-point safety belt, comprising the steps of:
    permitting forward displacement of the vehicle occupant in the event of an accident;
    controlling a direct slackening of the safety belt in dependence on the permitted forward displacement such that the reaction force (belt force) transmitted to the vehicle occupant does not exceed a pre-set maximum value; and measuring the weight of the vehicle occupant and wherein the step of controlling the direct slackening of the safety belt includes controlling the direct slackening in dependence on the weight measured.

19. A method for the restraint of a vehicle occupant with the aid of a vehicle restraint system which comprises a windable three-point safety belt, comprising the steps of:
   permitting forward displacement of the vehicle occupant in the event of an accident;
   controlling a direct slackening of the safety belt in dependence on the permitted forward displacement such that the reaction force (belt force) transmitted to the vehicle occupant does not exceed a pre-set maximum value;
   storing pre-set maximum values of motor vehicle characteristics and/or occupant values in a characteristic field in a memory of a control; reading the stored maximum values out of memory in the event of an accident, stored maximum values are read out of the memory; and
   wherein the slackening of the safety belt takes place in dependence on the maximum values read such that the belt force falls short of the maximum value.

20. A method for the restraint of a vehicle occupant with the aid of a vehicle restraint system which comprises a windable three-point safety belt, comprising the steps of:
   permitting forward displacement of the vehicle occupant in the event of an accident;
   controlling a direct slackening of the safety belt in dependence on the permitted forward displacement such that the reaction force (belt force) transmitted to the vehicle occupant does not exceed a pre-set maximum value; and
   wherein the direct slackening of the safety belt is controlled such that the pre-set maximum value of the belt force is achieved as early as possible—relative to the time of the impact of the accident—and is maintained for the time of the impact of the accident.

* * * * *